Patented June 24, 1930

1,766,767

UNITED STATES PATENT OFFICE

CHARLES L. VOTAW AND CHARLES A. ANDREWS, OF BAKERSFIELD, CALIFORNIA

PROCESS OF TREATING REFRACTORY AURIFEROUS ORES

No Drawing.   Application filed April 25, 1928. Serial No. 272,866.

Our invention relates to a process of treating refractory auriferous ore in which the gold is present in other than the free state.

In auriferous ores containing gold in a free state no special difficulty is encountered in recovering the values thereof by a smelting operation. In auriferous ores in which the gold is present in an extremely minute and finely divided state and is either in chemical combination with tellurium or chlorine or otherwise, or is merely associated with iron pyrites, arsenic, sulphur and other elements volatile in the temperatures of the smelting furnace, it has been found that the ordinary smelting operations will not recover the values, but recover only a part of the values or occasionally none at all when gold may be present in fairly considerable quantities.

It is believed that gold combined or associated with the elements volatile in the smelting operations, as just stated, volatilizes also and therefore escapes and is not recovered.

It is an object of this invention to provide a simple, inexpensive but highly efficient method whereby the gold present in such refractory auriferous ores may be recovered in the ordinary smelting operation.

Our invention consists of the steps of the process hereinafter described and claimed.

The refractory auriferous ore in which the gold is not present in a free state and which may be associated or combined with elements such as tellurium, chlorine, sulphur, iron, copper, arsenic, silver, lead and others, is pulverized to a fineness of preferably 200 mesh screen and treated with a solution prepared as follows:

1 kilo of sodium cyanide (NaCN)
7 kilos of sodium hydroxide (NaOH)
14½ kilos of sodium bi-carbonate (NaHCO$_3$)
dissolved in 600 litres of water. Sufficient of the solution is taken to cover the pulp which is preferably agitated, altho this agitation is not strictly necessary, and allowed to stand from six to twelve hours. It is not essential that the ore be pulverized to 200 mesh screen, coarser material may be treated, but it will require a correspondingly longer period of time for the solution to act on the ore. The ore pulp, without removing the solution, is dried and then subjected to the ordinary smelting operation, that is, it is fluxed with soda, mixed with litharge and argol and covered with salt, or any other necessary fluxes, depending upon the nature of the ore, may be used. However, we prefer to omit the borax as a fluxing ingredient, for we have found that in some ores the borax seems to interfere with the complete recovery of the values. The gold is retained in the metal lead formed during the smelting operation and is refined in the usual manner.

It is believed that the treatment of the ore with the solution described prior to the smelting operation converts the gold in the refractory ore to a condition which may be called the free state, making it then amenable to the ordinary smelting process and thus preventing its volatilization and loss during the latter.

The proportions of the ingredients for the solution may vary widely and still give good results, tho by extensive experiments we prefer the proportions as indicated.

In place of sodium cyanide potassium cyanide may be used, care being taken to take a chemical equivalent of the cyanide radical, and in place of sodium hydroxide a chemical equivalent of potassium hydroxide may be used, and a chemical equivalent of ordinary sodium carbonate may be substituted for the sodium bi-carbonate.

While our new process of treating refractory auriferous ores has for its principal object the recovery of the gold, we find that it also recovers or at least increases the amount of silver recovered where gold is associated with silver, which is practically always the case.

Various changes may be made in the steps of the process of our invention by those skilled in the art without departing from the spirit of our invention, as claimed.

We claim:

1. A process of treating refractory auriferous ores containing gold in other than the free state, comprising grinding the ore and forming a pulp by adding a solution containing a cyanide, a hydroxide of the alkali metals and sodium carbonate, drying said pulp without removing the solution and smelting said dried pulp.

2. A process of treating refractory auriferous ores containing gold in other than the free state comprising grinding the ore, forming a pulp by adding a solution containing sodium cyanide, sodium hydroxide and sodium bi-carbonate, drying said pulp without removing the solution fluxing and smelting said dried pulp.

3. A process of treating refractory auriferous ores containing gold in other than the free state comprising grinding the ore, forming a pulp by adding a solution containing the following reagents in the proportions by weight stated: sodium cyanide 1 part, sodium hydroxide 7 parts, sodium bi-carbonate 14½ parts, drying the pulp without removing the solution, fluxing and smelting said dried pulp.

In testimony whereof we have signed our names to this specification.

CHARLES L. VOTAW.
CHARLES A. ANDREWS.